United States Patent
Girlando et al.

(10) Patent No.: US 7,069,807 B2
(45) Date of Patent: Jul. 4, 2006

(54) ADJUSTABLE SHIFT DETENT ASSEMBLY

(75) Inventors: Matthew Girlando, Munich (DE);
Landon Ball, Laurinburg, NC (US);
Patrick L. Scheib, Pinehurst, NC (US)

(73) Assignee: ZF Meritor, LLC., Maxton, NC (US)

( * ) Notice: Subject to any disclaimer, the term of this patent is extended or adjusted under 35 U.S.C. 154(b) by 0 days.

(21) Appl. No.: 10/728,269

(22) Filed: Dec. 4, 2003

(65) Prior Publication Data

US 2004/0112163 A1    Jun. 17, 2004

Related U.S. Application Data

(63) Continuation of application No. 10/078,216, filed on Feb. 19, 2002, now abandoned.

(51) Int. Cl.
*B60K 20/00*    (2006.01)
(52) U.S. Cl. ............................. 74/473.18; 74/473.25
(58) Field of Classification Search ............. 74/473.25, 74/473.18
See application file for complete search history.

(56) References Cited

U.S. PATENT DOCUMENTS

| | | | | |
|---|---|---|---|---|
| 1,938,796 A | * | 12/1933 | Bernard ................... 74/473.21 |
| 3,054,302 A | * | 9/1962 | Cone ....................... 74/473.28 |
| 3,625,032 A | * | 12/1971 | Muhleck ..................... 70/202 |
| 4,259,878 A | * | 4/1981 | Anderson ................... 74/491 |
| 4,503,727 A | * | 3/1985 | Ballendux ............... 74/473.24 |
| 4,584,895 A | * | 4/1986 | Holmes .................. 74/473.26 |
| 5,467,963 A | * | 11/1995 | Crofts et al. .......... 251/129.18 |
| 5,476,422 A | * | 12/1995 | Schendel ................... 474/49 |
| 5,562,011 A | * | 10/1996 | Bartus .................... 74/473.24 |
| 5,911,444 A | * | 6/1999 | Buchter et al. .............. 285/69 |
| 6,067,871 A | * | 5/2000 | Markyvech et al. ..... 74/473.21 |
| 2002/0112557 A1 | * | 8/2002 | Burger .................... 74/473.27 |

* cited by examiner

*Primary Examiner*—David Fenstermacher
(74) *Attorney, Agent, or Firm*—Carlson, Gaskey & Olds

(57) ABSTRACT

A vehicle transmission detent assembly is provided that includes a housing having a bore. A movable shift rail is supported by the housing and includes a recess at least partially aligned with the bore. A detent is at least partially arranged within the bore and engages the recess. A biasing member generates a force on the detent and urges the detent into engagement with the recess. An adjustment member threadingly received within a portion of the housing coacts with the biasing member. Upon manipulation of the adjustment member, the biasing member may be moved between a plurality of compressive states in which each of the states generates a different force on the detent. In this manner, the biasing spring may be compressed or uncompressed to provide a desired shift feel.

17 Claims, 2 Drawing Sheets

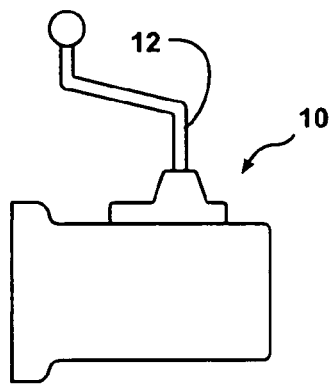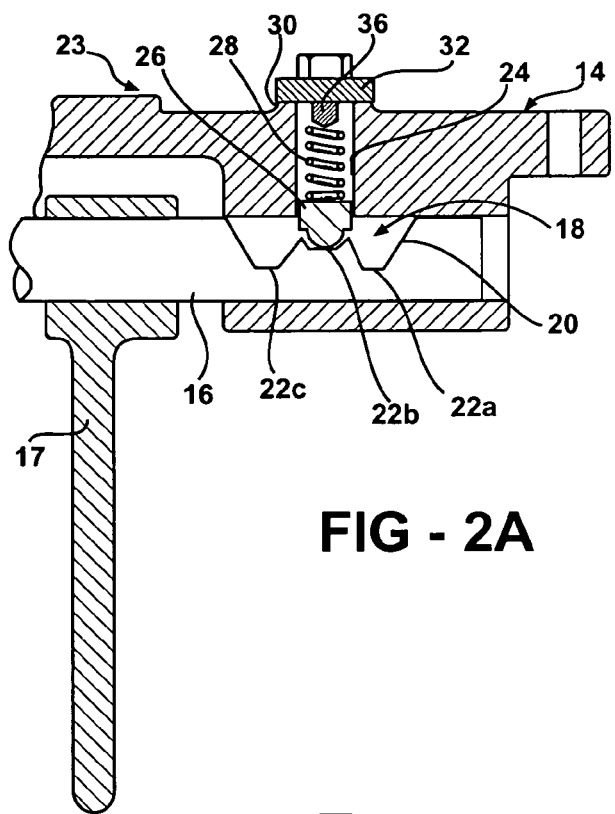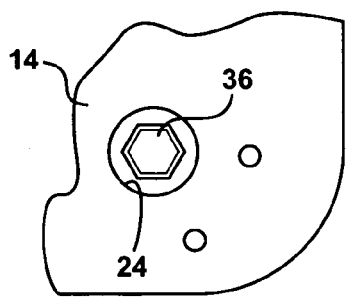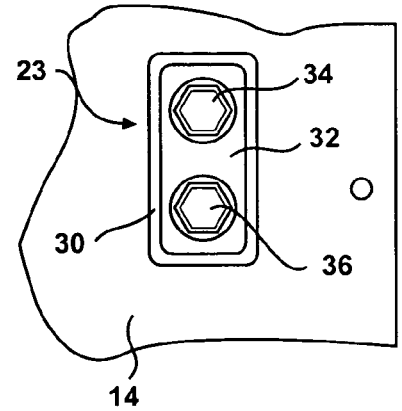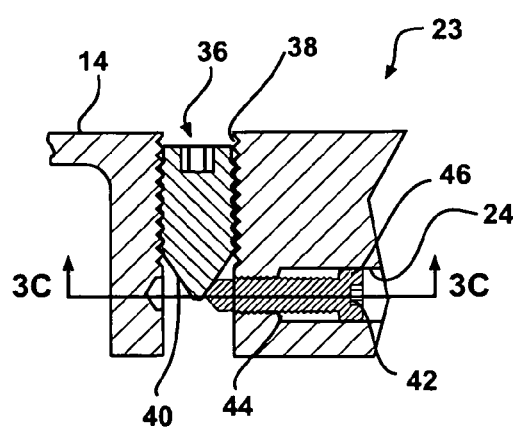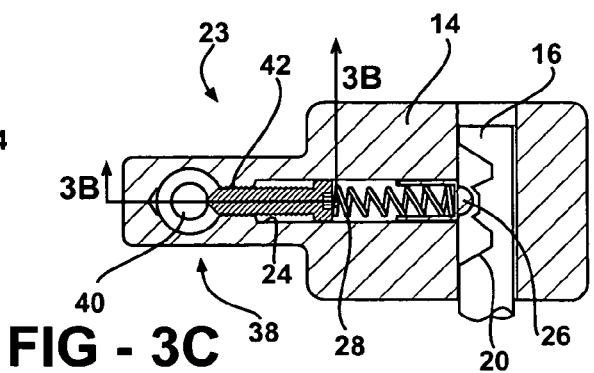

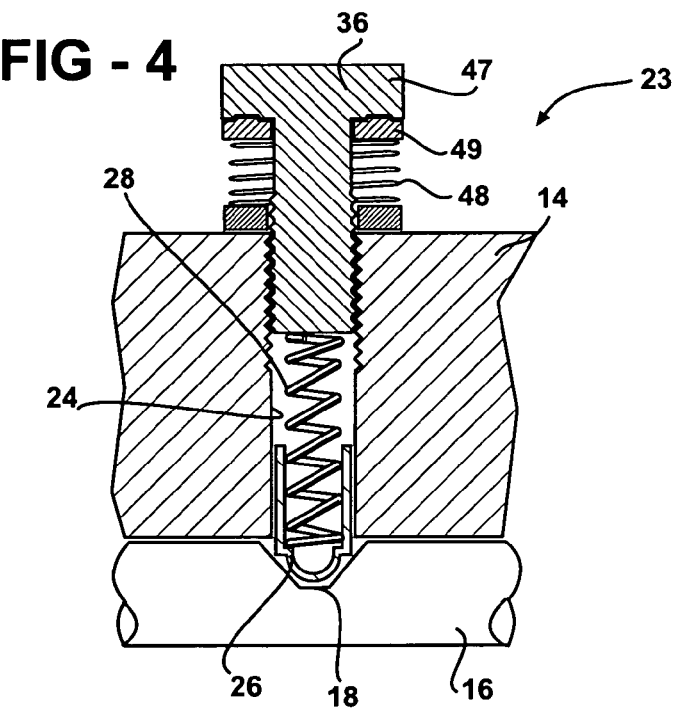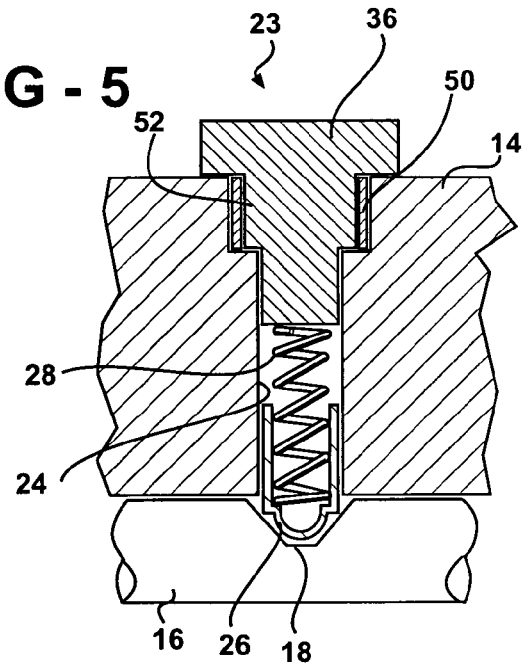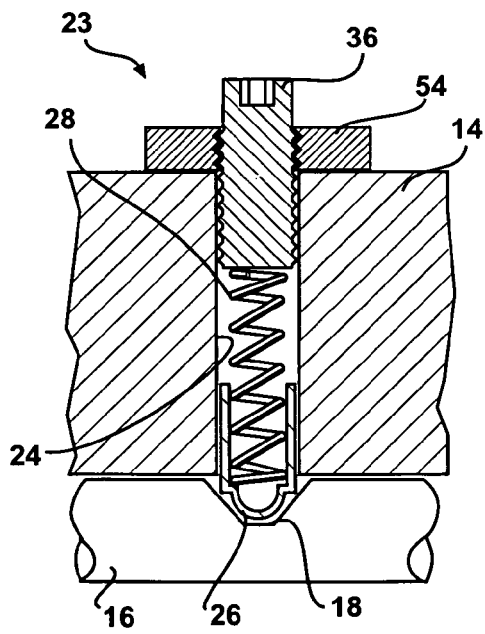

US 7,069,807 B2

1

ADJUSTABLE SHIFT DETENT ASSEMBLY

This application is a continuation of Ser. No. 10/078,216 filed on Feb. 19, 2002, now abandoned.

BACKGROUND OF THE INVENTION

This invention relates to a detent assembly for a transmission, and more particularly, the invention relates to an adjustable detent assembly for varying the shift feel of the shift lever.

Manual transmissions typically include a shift lever that may be manipulated by a vehicle operator to shift the transmission between gears. Heavy vehicles incorporate numerous powertrain configurations and numerous body configurations having different cabs. For example, different transmissions may be used in combination with various engines. Similarly, due to different cab configurations and the arrangement of the interior within the cab, the location of the shift lever must be tailored to place the shift lever sufficiently near the vehicle operator. Commonly, shift levers are bent for a particular configuration so that the shift lever is within reach of the vehicle operator.

Detent assemblies are used to provide feedback or a shift feel to the vehicle operator so that the vehicle operator can tell through shift resistance the location of the shift lever in the shift pattern. Once the shift lever and shift mechanism are located in a desired position, the detent assembly retains the shift lever and shift mechanism in that position until acted on by the vehicle operator. Typically, the detent assembly is associated with a shift rail that is manipulated by the shift lever throughout the shift pattern.

A standard detent assembly that has a fixed distance between the rail centerline and the biasing member's axial constraint may not be sufficient for all transmission applications. That is, a particular powertrain or vehicle configuration may necessitate different force characteristics than those provided by the standard detent assembly. For example, a shift lever bent in a particular shape reduce the ability of the detent assembly to maintain the positioning of the shift lever and shift mechanism. Also, a vehicle operator may desire a different shift feel than that provided by the standard detent assembly. Due to the shift lever configuration and/or driver preference. Therefore, what is needed is an adjustable detent assembly that may be tailored to a particular vehicle configuration or operator preference.

SUMMARY OF THE INVENTION AND ADVANTAGES

The present invention provides a vehicle transmission detent assembly including a housing having a bore. A movable shift rail is supported by the housing and includes a recess at least partially aligned with the bore. A detent is at least partially arranged within the bore and engages the recess. A biasing member generates a force on the detent and urges the detent into engagement with the recess. An adjustment member threadingly received within a portion of the housing coacts with the biasing member. Upon manipulation of the adjustment member, the biasing member may be moved between a plurality of compressive states in which each of the states generates a different force on the detent. In this manner the biasing spring may be compressed or uncompressed to provide a desired shift feel.

Accordingly, the above invention provides an adjustable detent assembly that may be tailored to a particular vehicle configuration or operator preference.

2

BRIEF DESCRIPTION OF THE DRAWINGS

Other advantages of the present invention can be understood by reference to the following detailed description when considered in connection with the accompanying drawings wherein:

FIG. 1 is a schematic view of a manual transmission;

FIG. 2A is a cross-sectional view through a portion of the transmission;

FIG. 2B is a top elevational view of the transmission portion shown in FIG. 2A;

FIG. 3A is a top elevational view of a portion of the transmission;

FIG. 3B is a cross-sectional view of an adjustable detent assembly;

FIG. 3C is a cross-sectional view of the adjustable detent assembly shown in FIG. 3B;

FIG. 4 is a cross-sectional view of another adjustable detent assembly;

FIG. 5 is a cross-sectional view of yet another adjustable detent assembly; and

FIG. 6 is a cross-sectional view of still another adjustable detent assembly.

DETAILED DESCRIPTION OF THE PREFERRED EMBODIMENT

A vehicle transmission 10 is shown schematically in FIG. 1. The transmission 10 includes a shift lever 12 bent to a desired shape for a particular vehicle configuration. The shift lever 12 extends into the vehicle cab to an area that may be easily reached by a vehicle operator. Referring to FIGS. 2A and 2B, the transmission 10 includes a transmission housing 14 that supports a movable shift member such as a shift rail 16. It is to be understood that a transmission housing 14 may include multiple components fastened together and may be formed and assembled by any suitable process. The shift rail 16 supports a shift fork 17 that manipulates shift collars and clutches to engage and disengage the gears within the transmission to achieve a desired gear ratio. The shift rail 16 includes a recess 18 that may include a profile 20 defining a plurality of shift positions 22a, 22b and 22c. The shift lever 12 is moved to manipulate the shift rail 16 and shift fork 17 to shift the transmission gears. Adjustable detent assembly 23 cooperates with the recess 18 to provide a shift feel and feedback to the vehicle operator as the shift rail moves between the shift positions 22a, 22b and 22c. The recess 18 may include one or more pockets. Furthermore, the detent assembly 23 retains the shift rail 16 in the selected position so that the desired gear ratio may be maintained until the vehicle operator selects another gear. While the detent assembly 23 of the present invention is described engaging a shift rail supporting a shift fork, it is to be understood that the adjustable detent assembly of the present invention may be used with any movable shift member within the transmission.

The housing 14 includes a bore 24 aligned with a portion of the recess 18. A detent 26 is at least partially disposed within the bore 24 and extends from the bore 24 to engage the recess 18. A resilient member such as a coil spring 28 is arranged within the bore 24 to urge the detent 26 into engagement with the recess 18 and generate a force profile on the shift rail 16 as the shift lever 12 moves the shift rail 16 through the shift positions 22a, 22b and 22c. With the prior art, only a single force profile may be achieved once the transmission 10 is assembled. However, the present invention utilizes an adjustment member 36 to achieve different compressive states with the spring 28 to apply a desired force on the detent 26, and in turn, the shift rail 16. In one embodiment, a plate 32 is secured to a housing boss 30 by a fastener 34. A portion of the plate 32 threadingly receives a threaded portion of the adjustment member 36. The adjustment member 36 may be either loosened or tightened to uncompress or compress the spring 28 and achieve a desired force profile on the shift rail 16. The hole in the plate 32 receiving the adjustment member 36 may be sufficiently small such that if the adjustment member 36 is removed the spring 28 will be retained within the bore 24. In this manner, the vehicle operator will not lose shift feel if the adjustment member 36 is inadvertently removed.

Referring to FIGS. 3A–3C, the adjustment member 36 may be arranged transverse to the bore 24 within a threaded hole 38. The adjustment member 36 may include a tapered end 40 that co-acts with a plunger 42 extending from the bore 24 into the threaded hole 38. The plunger 42 may include a flange 46 that retains the plunger 42 within a narrow portion 44 of the bore 24 if the adjustment member 36 is removed. Rotation of the adjustment member 36 will compress or uncompress the spring 28.

A liquid bonding agent such as Loctite® may be used to secure the adjustment member 36 within the threaded hole 38. Alternatively, a lock washer 48 and washer 49 arrangement may be arranged between a head 47 of the adjustment member 36 and the housing 14 to maintain the adjustment member 36 in a desired position once the desired detent force has been achieved, as shown in FIG. 4.

A bushing 50 may be arranged within the bore 24, as shown in FIG. 5. The adjustment member 36 may include a shoulder 52 that is received in an interference relationship within the bushing 50. The interference fit maintains the adjustment member 36 in the desired position once the desired detent force has been achieved.

Alternatively, a lock nut 54 may be secured to the threaded portion of the adjustment member 36 extending from the housing 14. Once the adjustment member 36 has been adjusted to the desired position, the lock nut 54 may be tightened against the housing 14 to maintain the adjustment member 36 in the desired position.

The invention has been described in an illustrative manner, and it is to be understood that the terminology that has been used is intended to be in the nature of words of description rather than of limitation. Obviously, many modifications and variations of the present invention are possible in light of the above teachings. For example, combinations of features of the various embodiments may be employed. It is, therefore, to be understood that within the scope of the appended claims the invention may be practiced otherwise than as specifically described.

What is claimed is:

1. A vehicle transmission detent assembly comprising:
   a housing having a bore;
   a movable shift member supported by said housing including a recess at least partially aligned with said bore;
   a detent at least partially disposed within said bore and engaging said recess;
   a biasing member urging said detent into engagement with said recess, said biasing member movable between a plurality of compressive states with each of said plurality of compressive states generating a different force on said detent corresponding to different shift feels;
   an adjustment member supported by a portion of said housing, said adjustment member coacting with said biasing member in a desired position compressing said biasing member to one of said plurality of compressive states corresponding to a desired detent force corresponding to a desired shift feel; and
   a securing member coacting with said adjustment member to retain said adjustment member in said desired position providing said desired detent force with said desired shift feel.

2. The assembly according to claim 1, wherein said movable shift member is a shift rail movable axially relative to said housing.

3. The assembly according to claim 2, wherein said shift rail supports a shift fork.

4. The assembly according to claim 2, wherein said recess includes a profile defining at least three axial shift positions.

5. The assembly according to claim 1, wherein said biasing member is a coil spring.

6. The assembly according to claim 1, wherein said securing member is a liquid bonding agent arranged between said bore and said adjustment member.

7. The assembly according to claim 1, wherein said housing includes a plate at least partially blocking said bore and retaining said biasing member therein with said adjustment member supported by said plate.

8. The assembly according to claim 1, wherein said securing member is a lock washer.

9. The assembly according to claim 1, wherein said securing member is a lock nut.

10. The assembly according to claim 1, wherein said securing member is a bushing providing an interference fit between said securing member and said adjustment member.

11. A vehicle transmission shift assembly comprising:
    a housing having a bore;
    a movable shift member supported by said housing and having a portion at least partially aligned with said bore;
    a biasing member generating a force on said movable shift member;
    an adjustment member coacting with said biasing member and moving said biasing member between a plurality of compressive states with each of said plurality of compressive states generating a different force, one of said different forces corresponding to a desired detent force; and
    a securing member coacting with said adjustment member to retain said biasing member in a desired compressive state providing said desired detent force.

12. The assembly according to claim 11, wherein said movable shift member includes a recess at least partially aligned with said bore, and a detent at least partially disposed within said bore and engaging said recess with said desired detent force acting on said detent.

13. The assembly according to claim 11, wherein said adjustment member is threaded and said bore threadingly receives said adjustment member.

14. A method of adjusting the shift feel to the operator of a transmission comprising the steps of:
    a) providing a transmission shift lever having a shift feel when moved between axial shift positions;
    b) providing a biasing member generating a biasing force indicative of the shift feel;
    c) manipulating an adjustment member operatively connected to the biasing member between a plurality of positions to achieve a desired shift feel; and
    d) securing the adjustment member in one of the plurality of positions with a securing member to retain the desired shift feel.

15. The method according to claim 14, wherein step c) includes uncompressing the biasing member.

16. The method according to claim 14, wherein step c) includes turning a threaded adjustment member.

17. The method according to claim 14, wherein step c) includes compressing the biasing member.

* * * * *